United States Patent [19]

Katto et al.

[11] Patent Number: 4,699,975

[45] Date of Patent: Oct. 13, 1987

[54] PROCESS FOR PRODUCING READILY CRYSTALLIZABLE ARYLENESULFIDE RESIN COMPOSITION CONTAINING ORGANIC ACID OR ANHYDRIDE

[75] Inventors: Takayuki Katto; Yukio Ichikawa, both of Iwaki, Japan

[73] Assignee: Kureha Kagaku Kogyo Kabushiki Kaisha, Tokyo, Japan

[21] Appl. No.: 836,509

[22] Filed: Mar. 5, 1986

[30] Foreign Application Priority Data

Mar. 7, 1985 [JP] Japan .................................. 60-45656

[51] Int. Cl.$^4$ ............................................. C08G 75/16
[52] U.S. Cl. .................................... 528/486; 524/112; 524/286; 524/287; 525/537; 528/388
[58] Field of Search ........................ 528/486; 525/537; 524/286, 287, 112

[56] References Cited

U.S. PATENT DOCUMENTS 3,354,129  11/1967  Edmonds ................................ 260/79

FOREIGN PATENT DOCUMENTS 52-12240  4/1977  Japan.
78257/84  5/1984  Japan.

OTHER PUBLICATIONS

U.S. Patent Application Ser. No. 746,252, (supplied by applicants).
U.S. Patent Application Ser. No. 748,464, (supplied by applicants).

*Primary Examiner*—Harold D. Anderson
*Attorney, Agent, or Firm*—Wenderoth, Lind & Ponack

[57] ABSTRACT

A readily crystallizable arylenesulfide resin composition is produced by adding, to 100 parts by weight of an arylenesulfide polymer, 0.01 to 10.0 parts of an organic acid or organic acid anhydride having a high boiling or melting point such as 2,6-naphthalene dicarboxylic acid, and then heating the mixture to a temperature not lower than the melting point of the polymer. The resulting resin composition is characterized in that its crystallization from its glass state and molten state is very rapid, in that it forms very fine spherulite structures, and in that it has a high degree of crystallization, a very crystallizable character, and other desirable characteristics.

8 Claims, No Drawings

PROCESS FOR PRODUCING READILY CRYSTALLIZABLE ARYLENESULFIDE RESIN COMPOSITION CONTAINING ORGANIC ACID OR ANHYDRIDE

BACKGROUND OF THE INVENTION

1. Field of the Invention

This invention relates to a process for producing a readily crystallizable arylenesulfide resin (hereinafter sometimes referred to as PAS) composition. More particularly, the invention relates to a process for producing a readily crystallizable PAS resin composition, which composition is characterized in that crystallization from its glass state and/or molten state is very rapid, in that it forms very fine spherulite structures, in that it has a high degree of crystallization, and in that it is very crystallizable and has other desirable characteristics.

2. Prior Art

The PAS resin represented by polyphenylenesulfide and the like has been used in varieties of industrial fields as engineering plastics having excellent heat resistance, flame retardance, chemical resistance, etc.

A PAS resin itself is a typical crystalline high-molecular resin, and it is necesary to increase its crystallization sufficiently and to provide the optimum crystalline state for it to exhibit its performances. Conventional PAS resins, however, have a disadvantage in that crystallization from their glass state or molten state is slow and coarse spherulites are formed.

In order to promote crystallization of crystalline polymers, it has been known to add to such polymers a so-called crystal-nucleating agent of talc or silica. In the case of PAS, however, use of such a nucleating agent was hardly effective. A method of influencing crystallization of PAS is disclosed in Japanese Laid-open Patent Application No. 78257/1984 Specification, which comprises adding to the PAS a water-soluble compound selected from an oxide or hydroxide of a metal of IA and IIA groups of the periodic table. This method, however, aims to further retard the melt crystallization velocity of the PAS. It is also disclosed in Japanese Laid-open Patent Application No. 152019/1983 to wash PAS with an inorganic acid or an organic acid such as acetic acid and benzoic acid or to add these acids to PAS so as to improve the thermal stability thereof.

SUMMARY OF THE INVENTION

We have conducted intensive research in order to solve the above mentioned problems, and found that a very readily crystallizable PAS resin composition can be produced by adding to PAS an organic acid or acid anhydride having a high boiling or melting point and heat-treating the mixture at the melting point of the PAS or higher temperature.

More specifically, the process for producing a readily crystallizable arylenesulfide resin composition according to the present invention is characterized by the process of adding to 100 parts by weight of an arylenesulfide polymer 0.01 to 10.0 parts by weight of an organic acid or organic acid anhydride having a high boiling or melting point and then heating the mixture to a temperature not lower than the melting point of the arylenesulfide polymer.

The PAS obtained according to the present process is very readily crystallizable, has an excellent crystalline state and also has the following characteristics:

(1) crystallization from a glass state and a molten state proceeds rapidly. The size of the spherulites obtainable is approx. 10 microns or smaller and is usually several microns;

(2) the resulting spherulite structures form very fine structures consisting essentially of a multiplicity of small spherulites; and (3) the PAS provides a large degree of crystallization.

As a result, the present PAS resin composition, which is readily crystallizable and has excellent crystalline state, has good moldability and provides molded products having excellent mechanical properties. For example, in the case of injection molding, a molded product having high crystallinity, microcrystalline structure and excellent mechanical properties can be readily produced in a short molding cycle. Also, in the case of producing films, filaments and the like, such products having high crystallinity, and excellent mechanical properties can be readily obtained.

In accordance with the present process, it is also possible to promote crystallization of PAS and improve its crystallizability as well as to control the flow characteristics of the polymer. For example, a long-chain aliphatic carboxylic acid such as stearic acid can markedly decrease the melt viscosity of the polymer, and thus a PAS resin composition having good flow properties can be obtained.

DETAILED DESCRIPTION OF THE INVENTION

Production of PAS Resin Compositions

PAS

The PAS to be used in the present invention is a homopolymer or copolymer containing as a main structural unit a repeating unit represented by the formula —Ar—S—. The PAS can contain a small amount of branch-linking or cross-linking represented by

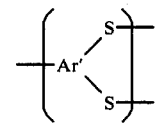

or the like, as long as the PAS contains the above mentioned repeating unit as the main structural unit.

The group Ar includes

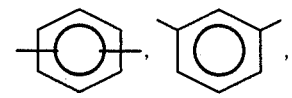

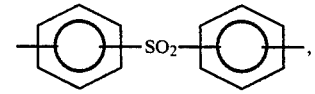

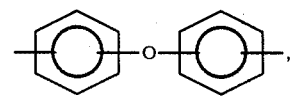

-continued

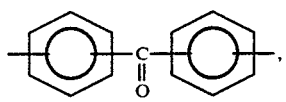

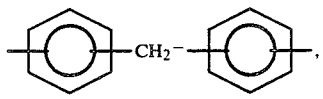

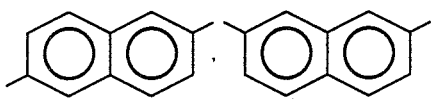

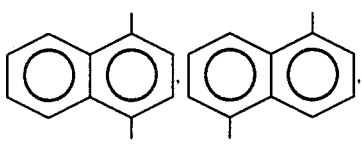

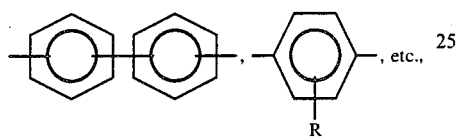, etc., wherein R is an alkyl or alkoxy group, preferably having 1 to about 4 carbon atoms ($C_1$ to about $C_4$). The group Ar' includes

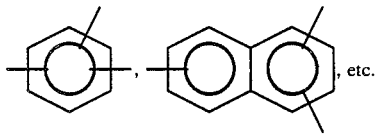, etc.

The

is preferably

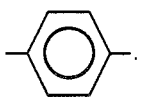

The PAS preferably used in the present invention is exemplified by a polyphenylenesulfide (PPS) containing 90 molar % or more of p-phenylenesulfide unit

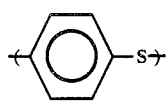

as the main structural unit of the polymer, and a phenylenesulfide block copolymer.

The PPS can contain less than 10 molar % of other copolymerizable structural units. Such copolymer structural units include, for example,

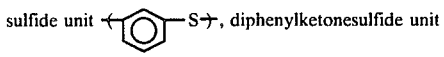, metaphenylenesulfide unit, diphenylketonesulfide unit

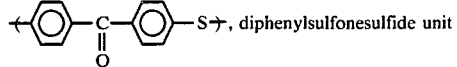, diphenylsulfonesulfide unit

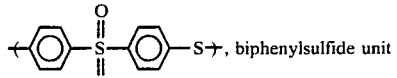, biphenylsulfide unit

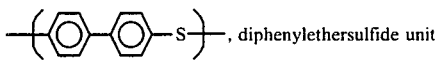, diphenylethersulfide unit

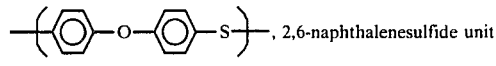, 2,6-naphthalenesulfide unit (structure), trifunctional sulfide unit (structure), etc.

In this connection, it is preferable that the amount of trifunctional units is not more than 1 molar %.

As such PPS, those synthesized according to conventional methods can be used. Such synthesis methods include a method disclosed in U.S. Pat. No. 3,354,129. This method comprises, for example, reacting p-dichlorobenzene with sodium sulfide in N-methylpyrrolidone (NMP) to produce a PPS. It is also suitable to employ a method which comprises reacting dichlorobenzene with sodium sulfide in NMP in the presence of an alkali metal salt of an organic acid such as lithium acetate and sodium acetate to produce a high molecular PPS, as described in Japanese Patent Publication No. 12240/1977. Other methods can also be employed to provide a still higher molecular PPS, such as a method wherein an inorganic salt such as lithium carbonate or calcium hydroxide is allowed to coexist during polymerization reaction in NMP and a method wherein the amount of coexisting $H_2O$ or polymerization temperature is controlled (Japanese Patent Laid-Open No. 7332/1986. Also, other PPS increased in melt viscosity which has been prepared by heating polymerized PPS in powder state in the presence of oxygen (preferably in air) at a temperature of not higher than its melting point can be used.

A block copolymer of p-phenylenesulfide and m-phenylenesulfide is suitably used as the phenylenesulfide block copolymer. The block copolymer consists essentially of the repeating unit (A)

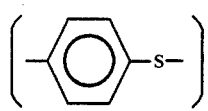

and a repeating unit (B)

wherein from 20 to 5,000 units on an average of the repeating units (A) linked together exist in the molecular chain in the form of the block component. The molar fraction (X) of the repeating unit (A) is preferably in the range of 0.50 to 0.98.

The repeating unit (B), which constitutes the block copolymer together with the repeating unit (A), is an aromatic repeating unit (—Ar—S—) wherein Ar denotes a residue of an aromatic compound, consisting essentially of meta(m-)phenylenesulfide repeating unit

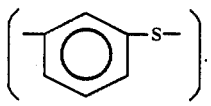

The term "essentially" herein means that the m-phenylenesulfide unit in the repeating unit (B) amounts to not les than 80 molar %, preferably 90 to 100 molar % of the unit (B). The aromatic repeating units (—Ar—S—) other than the m-phenylenesulfide repeating unit include one or more of the following groups:

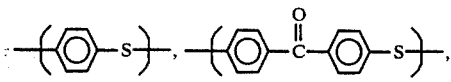

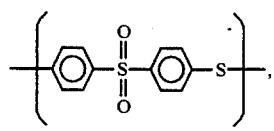

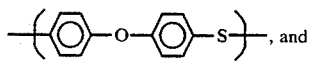, and

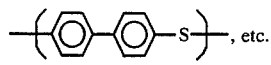, etc.

The block copolymer to be used in the present invention can be produced by any suitable method provided that the method can form a block of the p-phenylenesulfide repeating unit (A) and a block of repeating unit (B) consisting essentially of m-phenylenesulfide and can link both blocks together to produce the block copolymer. For example, the method disclosed in the Specification of Japanese Patent Laid-Open No. 14228/1984 can be employed. Specific examples of such methods include a method wherein one of the blocks is formed and then formation of the other block and linking of both blocks are simultaneously carried out and a method wherein both blocks are separately formed and then these blocks are linked together.

It can be said that the proces for producing the block polymer according to the invention is essentially not different from a conventional method for producing a phenylenesulfide polymer except that, in the present process, formation and linking of the blocks as well as the types of phenylenesulfide repeating units are taken into account with possible modification of the process.

More specifically, the process for producing the block polymer of the present invention comprises condensation under heating of an alkali metal sulfide and a dihalo aromatic compound (consisting essentially of p- and m-dihalobenzene) in an aprotic polar orgaic solvent (for example, NMP) where condensation comprises elimination of alkalimetal halide from both the reactants.

In this connection, it is desirable that the melt viscosity of this block copolymer be in the range of 50 to 100,000 poise measured at 310° C. and a shear velocity of 200 second$^{-1}$.

Organic Acid or Acid Anhydride

The organic acid or organic acid anhydride to be used in the present process is required to have a high boiling point or high melting point. Those having a boiling point of 270° C. or more or a melting point of 200° C. or more are preferably used. Those having a lower boiling point are not desirable because such an organic acid or acid anhydride is readily vaporized when heated to the melting point of PAS or higher. Thus, addition of such acid or anhydride is less effective and sometimes causes bubbles. The organic acid or anhydride having a high melting point is used when such acid or anhydride does not show a boiling point. It is not suitable, however, to use an organic acid or anhydride which has too high a melting point and remains solid without melting in the course of heat treatment of the PAS. Thus, it is preferable that "an organic acid or acid anhydride having a high boiling point or high melting point" to be used in the present invention be substantially liquid under the condition of the heat-treatment.

As such organic acid and organic acid anhydride, those of naphthalene series are preferred in view of their high boiling or melting points. Examples of such naphthalene compounds are shown in the following table.

| Compounds | melting point (°C.) | boiling point (°C.) |
|---|---|---|
| 2-hydroxy-3-naphthoic acid | 222 | — |
| 2,6-naphthalene-dicarboxylic acid | 310 to 313 | — |
| 1,4,5,8-naphthalene-tetra-carboxylic acid anhydride | >300 | >320 |
| 1,8-naphthalene-dicarboxylic acid anhydride | 267 to 269 | |
| 1-naphthoic acid | | >300 |
| 2-naphthoic acid | | >300 |

Some organic acids or acid anhydrides having high boiling or melting points other than those of naphthalene series are exemplified in the following table. As shown in the table, a polycarboxylic acid having a benzene ring, a carboxylic acid having a hydroxyl-substituted benzene ring, or an anhydride thereof are suitably used.

| Compounds | melting point (°C.) | boiling point (°C.) |
| --- | --- | --- |
| stearic acid | | 283 |
| terephthalic acid | 300 | |
| m-hydroxybenzoic acid | 201.5 | |
| p-hydroxybenzoic acid | 214.5 | |
| phthalic acid | 210 | |
| 1,2,4,5-benzene-tetra-carboxylic acid | 279 | |
| 1,2,4,5-benzene-tetra-carboxylic anhydride | 285 to 287 | |

As shown above, long-chain aliphatic carboxylic acids (e.g., stearic acid) are also useful.

Such organic acids and acid anhydrides can used alone or as a mixture of two or more compounds.

The quantities to be added of the organic acids or acid anhydrides depend on the properties of PAS to be treated. The optimum amount of addition is suitably determined according to the properties of a given PAS. In general, it is necessary to add at least 0.01 part by weight of the acid or anhydride per 100 parts by weight of PAS. On the other hand, it is not desirable to add more than 10.0 parts by weight from the viewpoint of the mechanical properties of the resulting PAS composition. 0.05 to 7.5 parts/100 parts PPS is preferable.

A variety of methods for adding the organic acid or anhydride to PAS in the practice of the present invention can be employed, as in the case of adding pigments to resin compositions. Such methods include, for example, a method of adding by mixing to PAS powder an organic acid or acid anhydride having a high boiling point without further treatment; a method of dissolving the acid or anhydride in a solvent, adding it to PAS powder and then drying the mixture; a method of adding it to PAS in the course of molding; a method of adding it to a freshly-polymerized PAS slurry and then carrying out dewatering, drying, etc.

Heat-treatment

The resulting mixture of PAS and the organic acid or acid anhydride is heated to a temperature of not lower than the melting point of PAS. The heating time is preferably within 5 hours.

The heating is preferably conducted by kneading the mixture in the molten state of PAS. The kneading can be carried out under stirring, by rollers, or in a melt-extruder. In the case of the latter melt-extruder, the heat treatment can be conducted simultaneously with melt-molding.

Because the effects of the organic acid or anhydride added are considerably influenced by the properties of PAS particles such as shapes and density, the treatment of melt kneading is effective. Also, such melt-kneading treatment is most preferred in view of its suitability for controlling crystallizability of the PAS to be treated.

PAS Resin Compositions

The readily crystallizable PAS obtained according to the present invention can be applied in various fields by utilizing such characteristics of the present PAS composition as its highly crystallizable property, absence of coarse spherulites, and its large crystallinity in general. For example, the present PAS composition is satisfactorily used for various molded articles by injection molding as well as for sheets, films, tubes, fibers and the like by extrusion molding. The present resin composition is especially suitable for injection molding because the resin composition is readily crystallizable and can be molded in a short injection cycle.

The present PAS resin composition can be compounded with a variety of additives as in the case of conventional thermoplastic resins because PAS itself is essentially a thermoplastic resin. More specifically, the resin composition of the present invention can be melt-mixed with powdery inorganic fillers such as mica, $TiO_2$, $SiO_2$, $Al_2O_3$, $CaCO_3$, carbon black, talc, $CaSiO_3$, $MgCO_3$, etc. or fibrous fillers such as glass fiber, carbon fiber, graphite fiber, aramide fiber, etc., to produce various compositions. Furthermore, the composition resin of the invention can be blended with compatible resin materials such as polyimides, polyamides, polyetheretherketones, polysulfone, polyethersulfones, polyetherimides, polyarylenes, polyphenylene ethers, polycarbonates, polyethyleneterephthalates, polybutyleneterephthalates, polyacetals, polypropylenes, polyethylenes, ABS, polyvinyl chlorides, polymethyl methacrylates, polystyrenes, polyvinylidene fluorides, polytetrafluoroethylenes, tetrafluoroethylene copolymers, etc., to obtain various compositions. In addition to these fillers, small amounts of coupling materials, antioxidants, coloring agents, etc., can also be used.

The heat-resistant films or sheets produced by molding the resin composition of the invention or a modified composition thereof are useful for electronic-electric applications such as substrates for printed circuits, magnetic tapes (coated type, vapor-deposition type or the like), insulating tapes, floppy discs, etc. The extruded moldings (such as plates, pipes, profiles, etc.) are useful for electronic-electric applications such as substrates for printed circuits, heat-insulating tubes for integrated wiring as well as for chemical-industrial applications such as various corrosion-resistant, heat-resistant pipings. A wire coated with the composition of the invention is useful as a heat-resistant, corrosion-resistant wire. Injection moldings are useful as IC sealing material for substrates for printed circuits, connectors, parts of a micro-wave devices and the like in the field of electronic and electric industries and as a large-scale pump, a large-scale valve, a sealing material, a lining material and the like in the field of chemical industries.

EXPERIMENTAL EXAMPLES

Evaluation of Properties (1) Measurement of crystallization temperature

The crystallization temperature was measured by means of a "differential scanning calorimeter DSC-30" supplied by Shimazu Seisakusho, Japan. The crystallization temperature from a glass state ($T_{c1}$) was determined by an exothermic peak when 10 mg of a quenched sample was heated in a nitrogen stream from room temperature at a heating rate of 10° C./minute. The crystallization temperature from a molten state ($T_{c2}$) was determined by an exothermic peak when the sample was cooled from 340° C. at a cooling rate of 10° C./minute.

A lower $T_{c1}$, a higher $T_{c2}$ and a sharp exothermic curve denote a high velocity of crystallization.

(2) Spherulite size

The size of a spherulite, when the sperulites were caused to collide together by melting the sample at 340° C. for 5 minutes and then crystallizing it at a cooling rate of 2° C./minute, was measured by means of a polarizing microscope equipped with a heating stage device (a cooling/heating device TH-600 for microscope supplied by Linkam Scientific Instruments.

(3) Degree of crystallization Ci

This degree of crystallization was calculated from the expression $$Ci = [Ac/(Ac + Aa)] \times 100,$$

where the crystalline scattering strength Ac and amorphous scattering strength As at $2\theta = 17°$ to 23° were obtained by separating them from the corresponding wide angle X-ray diffraction pattern. For the details, reference is made to J. Applied Polymer Sci. 20, 2541 (1976). The Ac and Aa were measured with a heat-treated sheet of a polymer, which was prepared by melt-pressing a polymer at a temperature about 30° C. higher than its melting point, quenching it with cold water into a sheet 0.1 to 0.2 mm thick, and then heat-treating the sheet at 260° C. for 20 minutes to crystallize the polymer.

(4) Melt viscosity

The melt viscosity was measured under the conditions of 310° C. and a shear velocity of 200 second$^{-1}$ by means of a Koka type flow tester.

EXAMPLE 1

A 10-liter autoclave was charged with 4.5 kg of NMP and 1.696 kg of Na$_2$S.5H$_2$O (10 mols of Na$_2$S) containing 46.02% by weight of Na$_2$S, and the mixture was gradually heated to 202° C. in an atmosphere of N$_2$ to distill off 683 g of water, 417 g of NMP and 0.31 mol of H$_2$S. In this procedure, the water in the system amounted to about 1.33 mol per mol of Na$_2$S. After allowing the system to cool to 130° C., 1.439 kg of p-dichlorobenzene (PDCB) (molar ratio of PDCB/Na$_2$S = 1.01/1.00) and 0.75 kg of NMP were added thereto, and polymerization was conducted at 210° C. for 10 hours. Then, 466 g of water was introduced into the polymerization slurry with pressurized nitrogen (total amount of water amounting to 4 mol per mol of Na$_2$S), and the resulting slurry was heated to 260° C. and subjected to polymerization for 10 hours. After cooling, pearl-like poly-p-phenylenesulfide (PPPS) was sieved from NMP, PPS oligomers, etc., washed repeatedly with deionized water, and dried at 100° C. for 3 hours to obtain P-PPS. The yield of the polymer was 88%, and the melt viscosity thereof was 4000 poise under the conditions of 310° C./200 sec$^{-1}$. The melting point measured by a differential scanning colorimeter was 283° to 285° C.

Each powder such as each of the organic acids shown in Table 1 was blended with 100 parts by weight of the resulting PPPS. The blend mixture was subjected to melt-kneading treatment by extrusion with a small extruder into pellets (extrusion temperature 320° C., means residence time 3 minutes).

The properties of the polymers thus obtained are shown in the following Table 1.

TABLE 1

| Organic acid, etc. | Quantity added (part by wt.) | T$_{c2}$ | Peak |
|---|---|---|---|
| (starting PPPS) | 0 | 213 | broad |
| The present invention | | | |
| terephthalic acid | 1.0 | 235 | sharp |
| 2,6-naphthalene dicarboxylic acid | 1.0 | 235 | sharp |
| m-hydroxybenzoic acid | 1.0 | 233 | sharp |
| 2-hydroxy-3-naphthoic acid | 1.0 | 233 | sharp |
| Comparative Examples | | | |
| benzoic acid | 1.0 | 214 | broad |
| sodium benzoate | 0.5 | 220 | broad |
| calcium benzoate | 0.5 | 221 | broad |
| sodium m-hydroxybenzoate | 0.5 | 218 | broad |
| talc | 0.5 | 214 | broad |
| Aerosil 380 | 0.5 | 220 | broad |

From the above results, it is seen that the present resin composition has a high crystallization temperature from its molten state (T$_{c2}$) and a sharp peak and thus is very readily crystallizable.

On the other hand, as to the resin composition outside of the present invention, benzoic acid is not effective because of its boiling point being as low as 249° C., and also organic salts are not very effective. No substantial effect is observed with talc or Aerosil known as a crystal-nucleating agent.

EXAMPLE 2

The polymerization in Example 1 was repeated to obtain a poly-p-phenylenesulfide except that polymerization was conducted for 8 hours after raising the temperature to 260° C.

The yield of the resulting polymer was 87%, and the melt visocosity at 310° C./200 second$^{-1}$ was 3300 poise.

Each powder such as each of the organic acids shown in Table 2 was blended with 100 parts by weight of the PAS polymer. The blended mixture was subjected to melt-kneading treatment by extrusion with a small extruder into pellets (extrusion temperature 320° C., means residence time 3 minutes). The properties of the resulting polymer compositions are shown in the following Table 2.

TABLE 2

| Organic acids | Quantity added (part by weight) | melt viscosity | T$_{c1}$ | T$_{c2}$ | Ci | Spherulite size ($\mu$) |
|---|---|---|---|---|---|---|
| (Starting P A S) | — | 3300 | 134 | 217 | 30 | about 100 |
| terephthalic acid | 0.5 | 2500 | 125 | 235 | 37 | <3 |
| 2,6-naphthalene-dicarboxylic acid | 0.5 | 2900 | 125 | 241 | 35 | <3 |
| 1,4,5,8-naphthalenetetracarboxylic acid anhydride | 1.0 | 3000 | 128 | 236 | 35 | <3 |
| 1,8-naphthalene-dicarboxylic acid anhydride | 1.0 | 2600 | 122 | 242 | 38 | <3 |
| stearic acid | 5.0 | 1500 | 117 | 239 | 35 | <3 |

From the above results, it is seen that the resin composition produced according to the present invention has lower $T_{c1}$ temperatures and higher $T_{c2}$ temperatures and are very readily crystallizable from the glass state and molten state in comparison with the starting PAS resin. Furthermore, the crystallinity of the sheet crystallized at 260° C. for 20 minutes is greatly increased in comparison with that of the starting PAS resin.

Moreover, the spherulite size when the compositions are crystallized from the molten state is not more than the level of 3 microns and very fine spherulite structures are produced. It is seen that the crystalline state is optimum to exhibit high mechanical strength.

In the case of adding stearic acid, it is also seen that the effects of markedly lowering melt viscosity of the polymer and increasing flowability are clearly exhibited in addition to the above mentioned improvement of crystallizability.

EXAMPLE 3

[A] A 10-liter autoclave was charged with 4 kg of NMP and 1.870 kg of $Na_2S.5H_2O$ (11 mol of $Na_2S$) containing 45.9% by weight of $Na_2S$, and then gradually heated in 200° C. in an atmosphere of $N_2$ to distill off 762 g of water, 742 g of NMP and 9 g of $H_2S$. The amount of $H_2O$ in the system corresponds to 1.24 mol per mol of $Na_2S$. After cooling to 130° C., 1547 g m-DCB (the molar ratio of m-DCB/$Na_2S$ being 0.98/1.00), 2110 g of NMP and 50 g of $H_2O$ ($H_2O$ amounting to 1.5 mol per mol of $Na_2S$) were added to the reaction system, which was subjected to polymerization at 220° C. for 2 hours and then at 230° C. for 7 hours. The average polymerization degree was 80, which was calculated from the amount of terminal Cl in the polymer chain determined on a small amount of sampled polymer.

[B] A 20-liter autoclave was charged with 7.5 kg of NMP and 3.060 kg (18 mol) of $Na_2S.5H_2O$ containing 45.9% by weight of $Na_2S$, and gradually heated to 200° C. in an atmosphere of $N_2$ to distill off 1.268 kg of $H_2O$, 1.354 kg of NMP and 17.3 g of $H_2S$. The amount of $H_2O$ in the system was 1.17 mol per mol of $Na_2S$. After cooling to 140° C., 2.636 kg of PDCB (the molar ratio PDCB/$Na_2S$ was 1.025), 2.5 kg of NMP and 103.3 g of $H_2O$ ($H_2O$ amounted to 1.5 mol per mol of $Na_2S$), as well as 2315 g of poly-m-phenylenesulfide (PMPS) slurry (containing 3.087 mol of P-MPS polymer) which had been obtained in [A] above were added to the reaction mixture. The mixture was subjected to polymerization at 220° C. for 10 hours.

Additional $H_2O$ (1.296 kg) was introduced thereto under pressure (the total water content amounting to 5 mol per mol of $Na_2S$), and polymerization was carried out at 260° C. for 5 hours. Post-treatment was conducted as in Examples 1 and 2 to produce a phenylenesulfide block copolymer having a melt viscosity of 1,600 poise (310° C./200 $sec^{-1}$) in a yield of 85%. The ratio PPS/MPS according to infrared absorption spectroscopy was 85/15. The average chain length of p-phenylenesulfide repeating unit was about 450, which was calculated from the average chain length of the m-phenylenesulfide repeating unit 140 and the molar ratio (0.85). The crystalline melting point thereof was 273° C.

Each of powders such as those of the organic acids shown in Table 3 was blended with 100 parts by weight of the resulting phenylenesulfide block copolymer, and the mixture was subjected to melt-kneading treatment by extrusion with a small extruder into pellets (extrusion temperature 320° C., mean residence time 3 minutes).

Properties of the resulting polymer compositions are shown in the following Table 3.

TABLE 3

| Organic acids | Quantity added (part by weight) | Melt viscosity | $T_{c1}$ | $T_{c2}$ | Spherulite size ($\mu$) |
|---|---|---|---|---|---|
| (Starting PAS) | — | 1600 | 122 | 214 | about 150 |
| 2,6-naphthalene-dicarboxylic acid | 1.0 | 830 | 111 | 241 | about 3 |
| 1,8-naphthalene-dicarboxylic acid | 1.0 | 1300 | 111 | 239 | about 5 |
| terephthalic acid | 1.0 | 910 | 112 | 242 | about 5 |
| stearic acid | 1.0 | 800 | 109 | 238 | about 5 |
| 2,6-naphthalene-dicarboxylic acid + terephthalic acid | 0.5 +0.5 | 1200 | 111 | 241 | about 3 |

From the above results, it is seen that phenylenesulfide block copolymers also become very crystallizable and form very fine spherulite structures, in accordance with the process of the present invention.

EXAMPLE 4

The organic acid shown in Table 4 was added to 100 parts by weight of poly-p-phenylenesulfide or poly-p-phenylensulfide block copolymer used in Examples 2 and 3. The mixture was kneaded at a resin temperature of 340° C. with a mean residence time of 3 minutes and then injection-molded under the conditions of a mold temperature of 120° C., injection pressure of 1,000 kg/sq.cm, and a mold holding time of 40 seconds.

The polymer containing no organic acid (not added) was insufficient in the process of crystallization and had poor mold-release property and poor shape retention. The present resin composition with the organic acid or the like added thereto had excellent mold-release property and shape retention, and also produced molded products having smooth surfaces. The results are summarized in the following Table 4.

TABLE 4

|  | Organic acids | Quantity added (part by wt.) | Mold-release property | Shape retention |
|---|---|---|---|---|
| Polyphenylenesulfide | not added | 0 | x | x |
|  | terephthalic acid | 1.0 | o | o |
|  | m-hydroxybenzoic acid | 1.0 | o | o |
| Polyphenylenesulfide | not added | 0 | x | x |
|  | 2,6-naphthalene-dicarboxylic acid | 1.0 | o | o |

TABLE 4-continued

| | Organic acids | Quantity added (part by wt.) | Mold-release property | Shape retention |
|---|---|---|---|---|
| copolymer | 1,8-naphthalene-dicarboxylic acid | 1.0 | o | o |

Note:
x denotes poor mold-release property or poor shape retention.
o denotes excellent mold-release property or shape retention.

What is claimed is:

1. A process for producing a readily crystallizable arylenesulfide resin composition, which comprises adding to a mixture of 100 parts by weight of an arylenesulfide polymer 0.01 to 10.0 parts by weight of an organic acid or organic acid anhydride having a high boiling point or a high melting point and heating the mixture to a temperature not lower than the melting point of the arylenesulfide polymer, the organic acid or organic acid anhydride being substantially liquid under the condition of the heat treatment.

2. The process according to claim 1, in which the organic acid or acid anhydride having a high boiling or melting point has a naphthalene ring.

3. The process according to claim 1, in which the organic acid having a high boiling or melting point is a polycarboxylic acid having a benzene ring.

4. The process according to claim 1, in which the organic acid having a high boiling or melting point is a carboxylic acid having a hydroxyl-substituted benzene ring.

5. The process according to claim 1, in which the organic acid having a high boiling or melting point is a long-chain aliphatic carboxylic acid having an aliphatic chain of 12 or more carbon atoms.

6. The process according to claim 1, in which the organic acid having a high boiling or melting point is selected from the group of 2-hydroxy-3-naphthoic acid, 2,6-naphthalene-dicarboxylic acid, 1,4,5,8-naphthalenetetracarboxylic acid anhydride, 1,8-naphthalene carboxylic acid anhydride, 1-naphthoic acid or 2-naphthoic acid.

7. The process according to claim 1, in which the organic acid having a high boiling or melting point is selected from the group of terephthalic acid, m-hydroxylbenzoic acid, p-hydroxylbenzoic acid, phthalic acids, 1,2,4,5-benzenetetracarboxylic acid, or 1,2,4,5-benzene tetracarboxylic acid anhydride.

8. An arylenesulfide resin composition which comprises 100 parts by weight of an arylenesulfide polymer selected from the group of polymers of p-phenylenesulfide in which polymer p-phenylenesulfide unit comprises at least 90 mole percent and a block copolymer comprising a block of p-phenylenesulfide units and a block consisting essentially of m-phenylenesulfide units and 0.01 to 10.0 parts by weight of an organic acid or organic acid anhydride having such a high boiling or melting point that it is liquid at a temperature at which the arylenesulfide is molten, the arylenesulfide polymer having spherulites smaller than approximately 10 microns, said composition being produced according to the process of claim 1.

* * * * *